Jan. 19, 1926.                                     1,570,468
H. E. FREEBURY
VALVE
Filed June 28, 1921

H. E. Freebury, INVENTOR.

BY Geo. P. Kimmel, ATTORNEY.

Patented Jan. 19, 1926.

1,570,468

UNITED STATES PATENT OFFICE.

HARVEY E. FREEBURY, OF BELFRY, MONTANA.

VALVE.

Application filed June 28, 1921. Serial No. 480,972.

*To all whom it may concern:*

Be it known that I, HARVEY E. FREEBURY, a citizen of the United States, residing at Belfry, in the county of Carbon and State of Montana, have invented certain new and useful Improvements in Valves, of which the following is a specification.

This invention relates to valves for controlling the passage of liquids, and has for its object to provide, in a manner as hereinafter set forth, a valve structure including means whereby the valve head will be effectually locked in position to prevent accidental or surreptitious shifting of the valve head from such position.

With these and other objects in view, the invention consists in certain novel features of construction as hereinafter shown, described and claimed.

Figure 1:
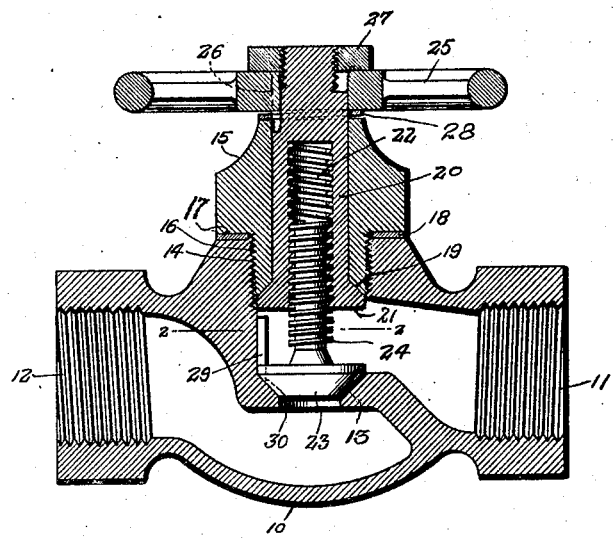
Figure 1 represents a longitudinal sectional elevation.
Figures 2, 3:
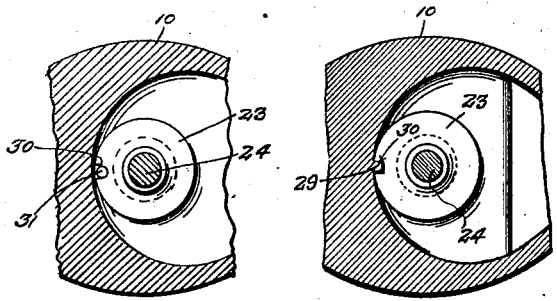
Figure 2 is a sectional detail on the line 2—2 of Fig. 1.
Figure 3 is a sectional detail illustrating a slight modification of the construction.

The improved device may be applied to various structures through which liquids are caused to pass, to control the flow therethrough, but is more particularly adapted for use in an ordinary globe valve, comprising a casing represented as a whole at 10 with an intake 11, outlet 12, valve seat 13, and an opening centrally of its top, as at 14, and with the wall thereof threaded, these parts being of the usual construction.

A tubular member 15 forms a part of the improved device and is provided with a reduced threaded portion 16 to engage the threads of the wall of the opening 14. The reduced portion 16 provides a lateral shoulder 17 to overlap the portion of the casing adjacent the opening. A packing ring 18 is disposed between the shoulder and the casing.

At its inner edge the member 15 is ground to form a conical seat 19.

Extending through the bore of the member 15, is a combined locking and operating element 20 for the valve head, to be presently referred to, and said element consists of a cylindrical body of a length greater than the length of the member 15 and further projects outwardly and inwardly with respect to the member 15. The element 20 is rotative within the member 15 and has its inner end formed with a conoidal-shaped laterally extending annular enlargement 21, which has its upper face corresponding to the shape of and engaging with the seat 19. The upper face of the enlargement 21 and the inner edge of the member 15 are ground to set up a liquid tight seat when engaged with each other. The element 20 is provided with a socket 22 which opens at the inner end thereof and the wall of said socket 22 is threaded, the threads of the socket being of different pitch with respect to the threads of the member 15. Engaging with the threads of the wall of the socket 22 is the peripherally threaded stem 24 of the valve head 23, which is adapted to engage the seat 13.

The element 20 projects a substantial distance above the tubular member 15 and the extended portion is reduced and the reduced portion is provided with peripheral threads engaged by a nut 27 which retains a hand wheel 25 on the element 20 between the nut and the tubular member 15. The element 20 has a flattened portion 26 to prevent the rotation of the wheel relative to the element 20.

A spring washer 28 is interposed between the hub of the wheel 25 and the outer end of the member 15, as well as surrounding the element 20, and the function thereof is to prevent looseness between the parts and to resiliently hold the annular enlargement 21 in engagement with its seat.

The casing 10, is provided with a vertically disposed rib 29 for the purpose of holding the valve head 23 from rotation as well as guiding said head when it is moved towards and away from the seat 13. The rib 29 is shown as formed on the inner face of the body portion 10 and in the path of the valve head 23, and the latter is formed with a vertically disposed marginal notch 30 into which extends the rib 29. The rib 29 co-acts with the walls of the notch 30 to prevent rotation of the valve head when it is moved towards and away from the seat 13. The annular enlargement 21 is self grinding on the seat 19 as is obvious.

The valve head 23 is adjusted towards or away from its seat when the element 20 is shifted in a clockwise or anti-clockwise direction respectively, due to the fact that the valve head 23 is held from rotation so that the stem 24 will shift towards or from the element 20, depending in which direction the element 20 is shifted through the medium of the wheel 25. The spring washer 28 provides a tight joint between the parts, at all times. When it is desired to lock the valve head in the position to which it has been shifted, the nut 27 is revolved on the threads of the element 20 in a direction tending to move the element 20 outwardly, so that the enlargement 21 will bind against the seat 19, and when the enlargement 21 is in binding engagement with the seat 19, the element 20 will be prevented from rotation relative to the member 15, and under such conditions the valve head 23 cannot be shifted until the element 20 is released. The direction in which the nut 27 is revolved is such as to cause the nut to move in an inward direction with respect to the element 20.

The preferred embodiment of the invention is disclosed in the drawings and set forth in the specification, but it will be understood that any modifications within the scope of the claimed invention may be made in the construction without departing from the principle of the invention or sacrificing any of its advantages.

Having thus described this invention, what is claimed as new is:

A valve comprising a casing having an internal valve seat and a guide rib extending from the seat, a member supported in said casing and having an internally threaded socket, means for rotating said member and a valve head having a threaded stem engaging said threaded socket and provided with a marginal notch slidably engaging said guide rib.

In testimony whereof, I affix my signature hereto.

HARVEY E. FREEBURY.